US007970839B2

(12) United States Patent
Gross et al.

(10) Patent No.: US 7,970,839 B2
(45) Date of Patent: Jun. 28, 2011

(54) AUTOMATIC DOWNLOAD OF IMAGES FROM ONLINE STORAGE

(75) Inventors: Yuval Gross, Kirkland, WA (US); Keith Fournier, Snoqualmie, WA (US); Tatjana Fournier, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 12/147,529

(22) Filed: Jun. 27, 2008

(65) Prior Publication Data
US 2009/0327431 A1    Dec. 31, 2009

(51) Int. Cl.
*G06F 15/16* (2006.01)
*G06F 12/00* (2006.01)
(52) U.S. Cl. ........................................ 709/206; 709/207
(58) Field of Classification Search .......... 709/206–207, 709/217–219, 223–227, 250
See application file for complete search history.

(56) References Cited

U.S. PATENT DOCUMENTS

| | | | |
|---|---|---|---|
| 6,938,211 B1 * | 8/2005 | Chang et al. | 715/733 |
| 7,069,237 B1 * | 6/2006 | Tate | 705/26 |
| 7,212,304 B2 | 5/2007 | McIntyre et al. | |
| 7,290,034 B2 | 10/2007 | Budd et al. | |
| 7,299,271 B2 | 11/2007 | Sato | |
| 7,542,050 B2 * | 6/2009 | Kramer et al. | 345/629 |
| 2003/0117663 A1 * | 6/2003 | Oonuma | 358/402 |
| 2003/0140104 A1 * | 7/2003 | Watanabe et al. | 709/206 |
| 2004/0158607 A1 | 8/2004 | Coppinger et al. | |
| 2005/0122345 A1 * | 6/2005 | Kim et al. | 345/629 |
| 2005/0148849 A1 | 7/2005 | Heere et al. | |
| 2006/0168012 A1 | 7/2006 | Rose et al. | |
| 2006/0265390 A1 | 11/2006 | Aldrich et al. | |
| 2007/0064126 A1 * | 3/2007 | Didow et al. | 348/239 |
| 2007/0094398 A1 | 4/2007 | Chou | |
| 2007/0121819 A1 * | 5/2007 | Kim et al. | 379/88.13 |
| 2007/0271343 A1 * | 11/2007 | George et al. | 709/206 |
| 2008/0266407 A1 * | 10/2008 | Battles et al. | 348/211.2 |
| 2008/0285090 A1 * | 11/2008 | Stumbo | 358/473 |

OTHER PUBLICATIONS

"Attachment Auto Saver for Outlook v1.2" http://www.fileheap.com/software-attachment-auto-saver-for-outlook-download-4151.html.
"Email Parser for Outlook Express, Microsoft Outlook, POP3" http://www.kadmy.com/process.html.

* cited by examiner

*Primary Examiner* — Zarni Maung (57) ABSTRACT

Various technologies for automatically downloading one or more high resolution image files from online storage. In one implementation, an e-mail client desktop application (stored at a sender's computer) may receive a request from the sender to send an e-mail with one or more high resolution image files added to the e-mail. Although the high resolution image files may be uploaded to a server, the files may be added as lower resolution image files with hidden Uniform Resource Locator (URL) addresses that may indicate the location on the server of the corresponding high resolution image files. Prior to sending the e-mail, the e-mail client desktop application may concatenate each high resolution image file's URL address with an extension or tag such as "?download" so that the address may later be easily identified.

20 Claims, 5 Drawing Sheets

AUTOMATIC DOWNLOAD OF IMAGES FROM ONLINE STORAGE

BACKGROUND

Electronic photographs have become an increasingly popular way to share photographs with others through electronic mail (e-mail). Attaching electronic photographs to an e-mail often increases the size of the e-mail and adds to the time it takes to download the e-mail. Often, the e-mail recipient may wish to view the photographs, but he does not have an interest in downloading the image to his local machine. In response to this issue, some e-mail client desktop applications convert the images attached to an e-mail to a lower resolution version of the original. The lower resolution version of the image may be embedded into the body of the e-mail, instead of being attached the original file. The original, high resolution, images are typically uploaded to some online storage for recipients to download if he so desires.

SUMMARY

Described herein are implementations of various technologies for automatically downloading one or more high resolution image files from online storage. In one implementation, an e-mail client desktop application (stored at a sender's computer) may receive a request from the sender to send an e-mail with one or more image files added to the message body of the e-mail. After receiving a selection to add the image files to the body of the e-mail, the e-mail client desktop application may convert the selected image files to a lower resolution image file and embed the resulting images within the message body of the e-mail. The e-mail client desktop application may then upload the image file's corresponding high resolution image files to a server, and it may list the Uniform Resource Locator (URL) addresses of each uploaded high resolution image file within the message body of the e-mail. Prior to sending the e-mail, the e-mail client desktop application may concatenate each high resolution image file's URL address with an extension or tag, such as "?download", so that the address may later be easily identified.

Upon receiving the e-mail, an e-mail client desktop application (stored at a receiver's computer) may determine if the incoming e-mail contains one or more images added to the message body of the e-mail. If the incoming e-mail contains one or more images added to the message body of the e-mail, a new link, such as "Save All Images," may then be created within the e-mail to allow the receiver to download all of the high resolution image files from the online storage. After the receiver selects the "Save All Images" link, a HyperText Markup Language (HTML) event handler may open a "Save As" dialog box to allow the receiver to specify the location in which to store the downloaded high resolution image files. Upon receiving input as to the location in which to save the high resolution image files, the HTML event handler may search the HTML body of the e-mail for the extension or tag added earlier by the sending e-mail client desktop application. Upon locating a tag, the HTML event handler may store the corresponding URL address into a temporary memory allocated within the e-mail client desktop application. After storing all of the URL addresses into the temporary memory location, the HTML event handler may then call upon an image downloader thread to download each high resolution image file.

The image downloader thread may extract a URL address from the temporary memory allocated within the e-mail client desktop application and use a URLMON component to download the high resolution image file to the local cache of the user's machine. The image downloader thread may then copy the high resolution image file from the local cache to the user specified location. The image downloader thread may repeat the downloading process for each URL address listed in the temporary memory allocated within the e-mail client desktop application.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to sending and receiving an e-mail with one or more image files added therein. The image files may include high resolution image files that may be uploaded to a server after the e-mail is sent to its recipient. The sent e-mail may contain low resolution versions of the high resolution image files such that the e-mail may be sent with a smaller file size. Upon receipt, the incoming e-mail may display an option to download all of the uploaded high resolution image files at one time. One or more implementations of various techniques for sending and receiving an e-mail with one or more image files will now be described in more detail with reference to FIGS. 1-5 in the following paragraphs.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
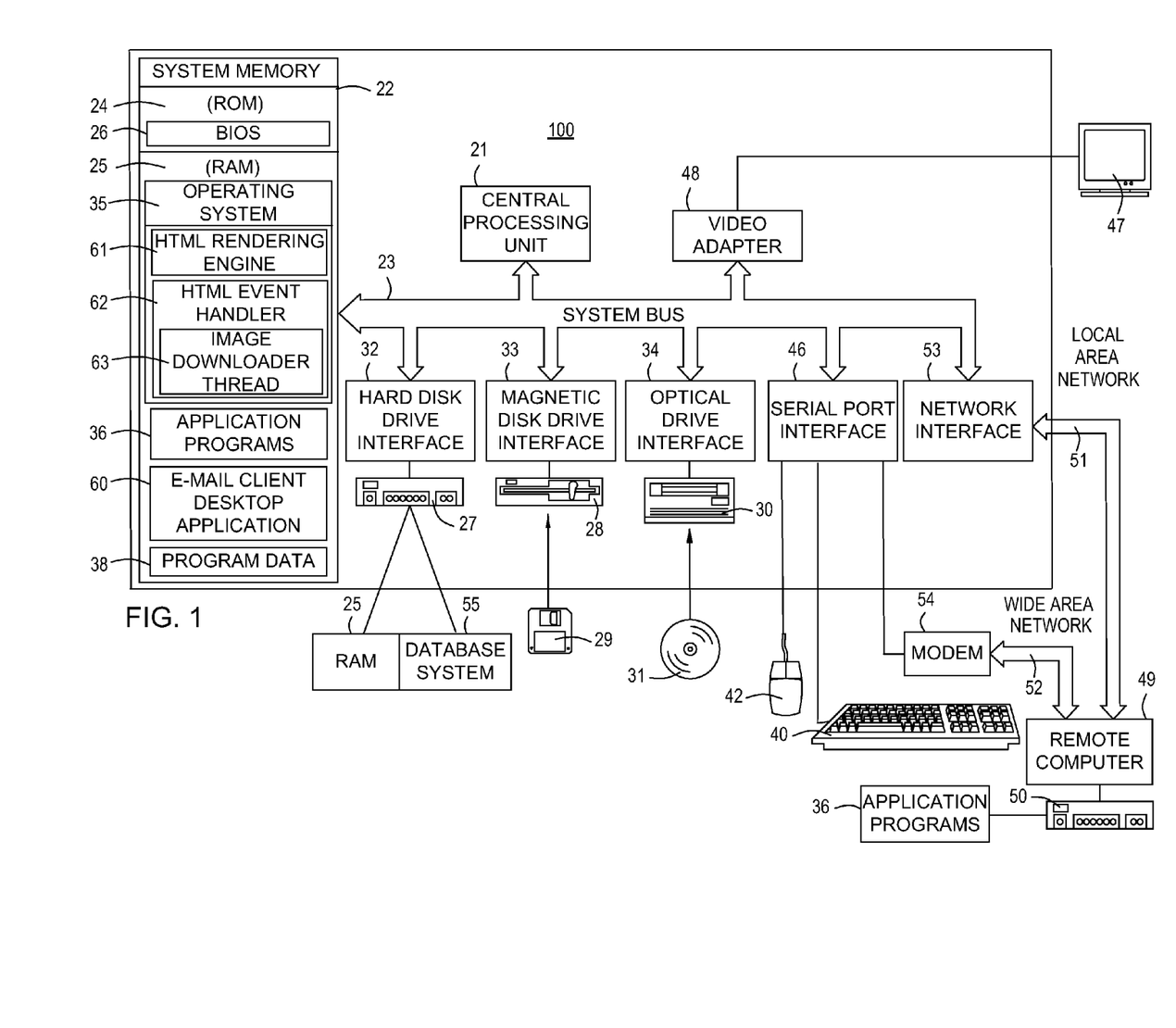
FIG. 1 illustrates a schematic diagram of a computing system in which the various techniques described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk, magnetic disk 29, optical disk 31, ROM 24 or RAM 25, including an operating system 35, one or more application programs 36, an e-mail client desktop application 60, program data 38 and a database system 55. The operating system 35 may be any suitable operating system that may control the operation of a networked personal or server computer, such as Windows® XP, Mac OS® X, Unix-variants (e.g., Linux® and BSD®), and the like. The operating system 35 may contain certain applications such as an HTML rendering engine 61 and an HTML event handler 62 that may be used to interpret and display HTML documents. The HTML event handler 62 may contain an application such as an image downloader thread 63. The e-mail client desktop application 60, the HTML rendering engine 61, the HTML event handler 62, and the image downloader thread 63 will be described in more detail with reference to FIGS. 2-5 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers, such as an e-mail server 49. The e-mail server 49 may be another personal computer, a server, a router, a network PC, a peer device or other common network node. Although the e-mail server 49 is illustrated as having only a memory storage device 50, the e-mail server 49 may include many or all of the elements described above relative to the computing system 100. The logical connections may be any connection that is commonplace in offices, enterprise-wide computer networks, intranets, and the Internet, such as local area network (LAN) 51 and a wide area network (WAN) 52.

The e-mail server 49 may be used to route e-mails from its source to its destination. Furthermore, the memory storage device 50 of the e-mail server 49 may be used to store e-mail attachments such as image files, documents, zip files, and the like.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
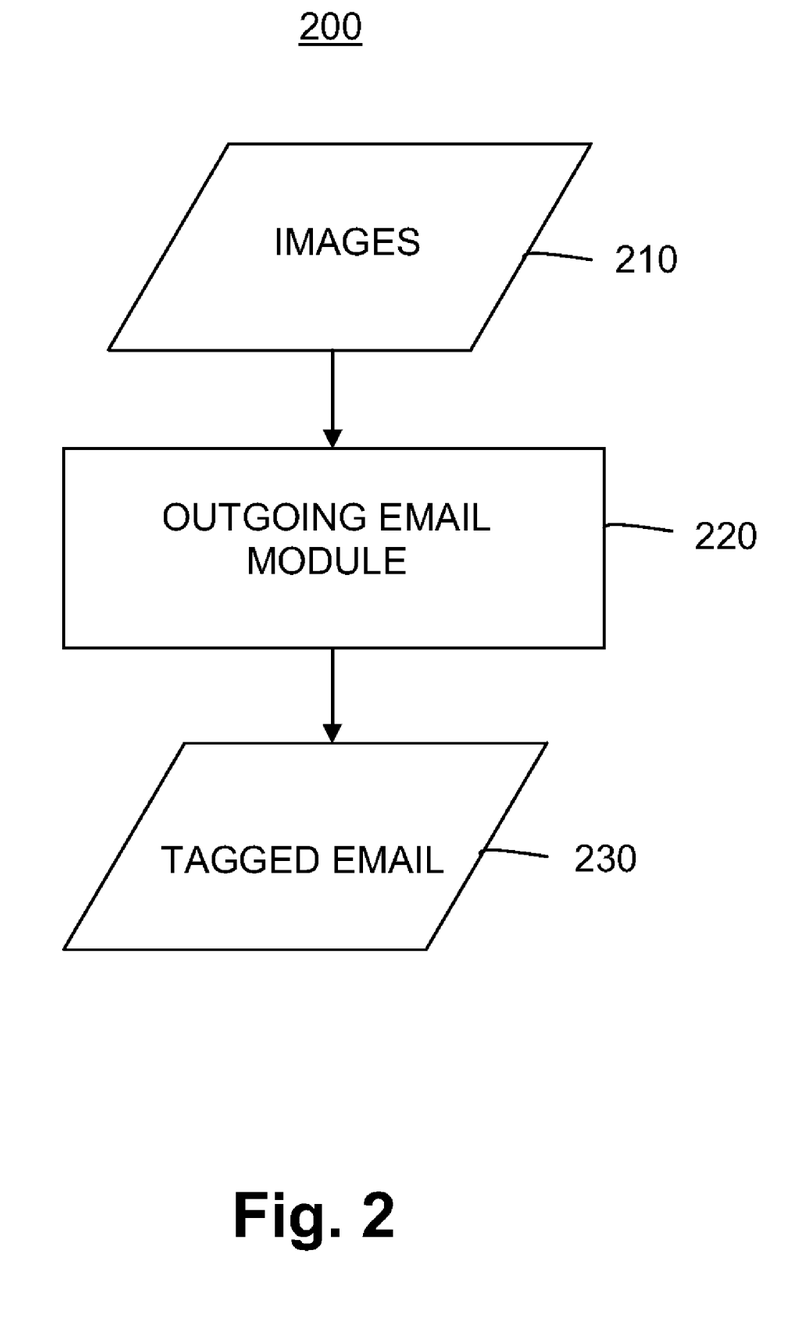
FIG. 2 illustrates a data flow diagram of a method for sending an e-mail with one or more image files added therein in accordance with one or more implementations of various techniques described herein.

FIG. 2 illustrates a data flow diagram for sending an e-mail with one or more image files added therein in accordance with one or more implementations of various techniques described herein. The following description of data flow diagram is made with reference to computing system 100 of FIG. 1 in accordance with one or more implementations of various techniques described herein.

In one implementation, the e-mail client desktop application 60 may receive a request from a user to add one or more images into the HTML body of an e-mail (outgoing e-mail). Here, the e-mail client desktop application 60 may provide the user an option to select the one or more images that he wishes to add into the HTML body of the outgoing e-mail. Upon receiving the user's selection, the e-mail client desktop application 60 may use the selected images, e.g., images 210, as an input for an outgoing e-mail module 220. The images 210 may include any type of image files such as Joint Photographic Experts Group (JPEG), Graphics Interchange Format (GIF), Tagged Image File Format (TIFF), or other type of image media file that may be stored on a memory device accessible to the computing system 100.

The outgoing e-mail module 220 may convert the images 210 into corresponding lower resolution versions of the images 210 so that they may be embedded into and displayed within the HTML body of the outgoing e-mail. The outgoing e-mail module 220 may then upload the original, high resolution, version of the images 210 to an online storage such as the memory storage 50 of the e-mail server 49. The outgoing e-mail module 220 may then insert a URL address within the HTML body of the outgoing e-mail to indicate the URL location of each high resolution image file. In one implementation, the inserted URL address may be hidden from the view of the user. The outgoing e-mail module 220 may also concatenate an extension or tag, such as "?download," to the URL addresses of each high resolution image file. The tag may be used to associate the URL address with the image file in the online storage. In one implementation, the extension or tag may be added to the end of a URL address. However, it should be noted that the extension or tag may also be added to the front of a URL address, or both to the front and the end.

The outgoing e-mail module 220 may then produce a modified version of the outgoing e-mail with the low resolution versions of images 210 embedded in its HTML body and the tags concatenated to the URL addresses of the high resolution versions of images 210 as its output. This modified version of the email may be referred to as a tagged e-mail 230. The e-mail client desktop application 60 may then send the tagged e-mail 230 to the e-mail server 49 via the LAN 51 or WAN 52 connection as shown in FIG. 1.

Figure 3:
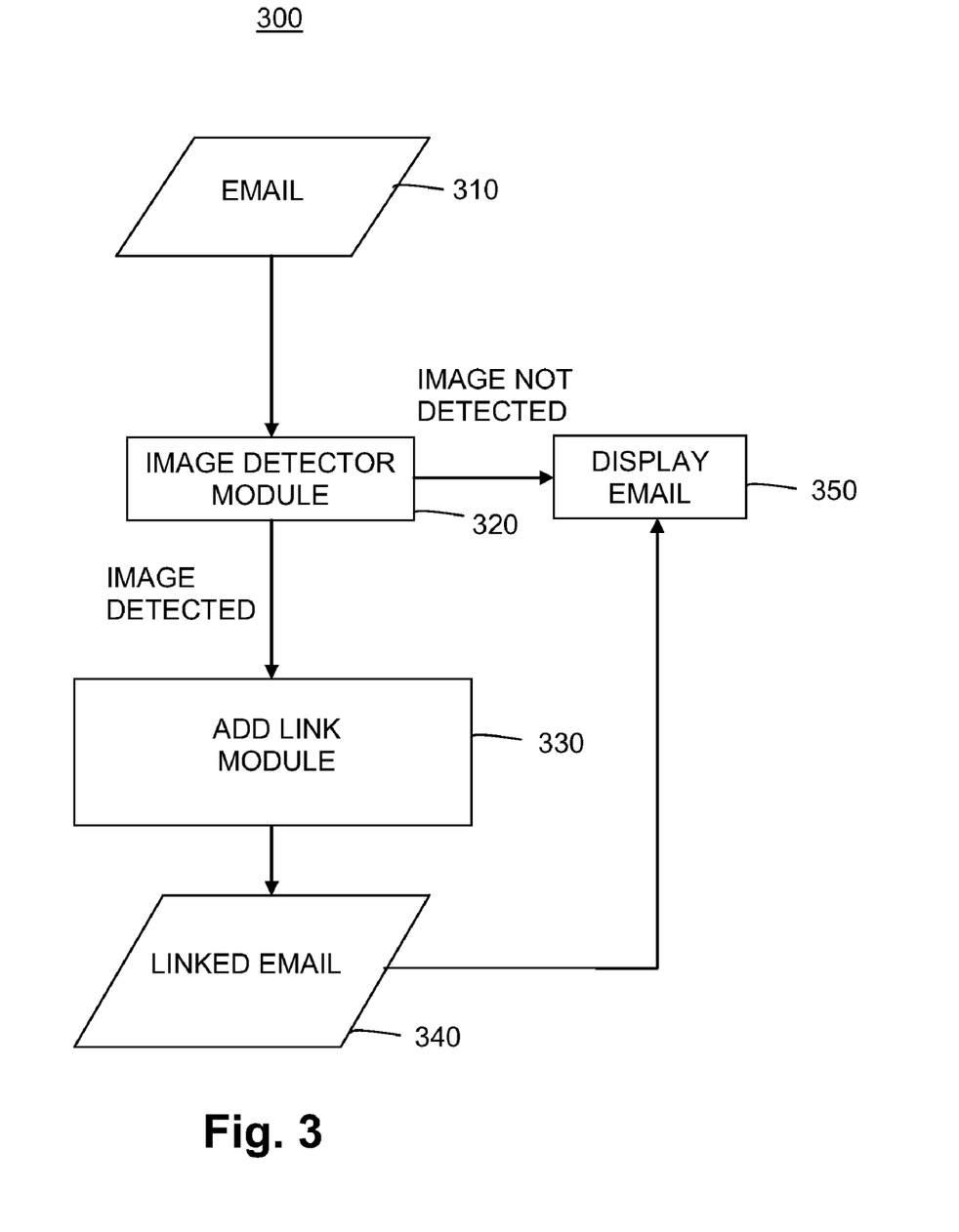
FIG. 3 illustrates a data flow diagram of a method for receiving an e-mail with one or more image files added therein in accordance with one or more implementations of various techniques described herein.

FIG. 3 illustrates a data flow diagram for receiving an e-mail with images embedded into the HTML body in accordance with one or more implementations of various techniques described herein. The following description of data flow diagram is made with reference to the computing system 100 of FIG. 1, the data flow diagram of FIG. 2, the flow diagram of FIG. 4, and the flow diagram of FIG. 5 in accordance with one or more implementations of various techniques described herein.

Upon receiving an e-mail 310, the e-mail client desktop application 60 (stored at a recipient's computer) may use the e-mail 310 as an input into an image detector module 320. The image detector module 320 may scan the e-mail 310 and determine if it contains any images 210 added inside the HTML body of the e-mail 310. If the e-mail 310 does not include any images 210 added to the HTML body of the e-mail, the image detector module 320 may use the e-mail 310 as an input to a display e-mail module 350. The display e-mail module 350 may then use the HTML rendering engine 61 to display the e-mail 310.

Figure 5:
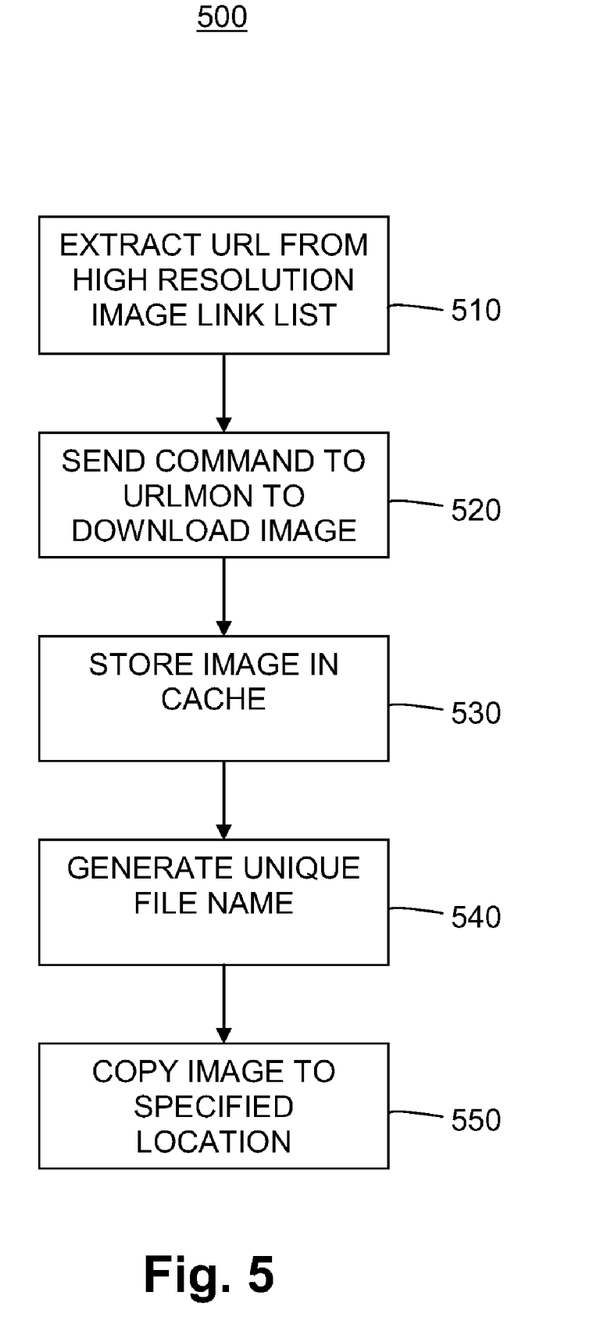
FIG. 5 illustrates a flow diagram of a method for downloading and storing the one or more image files in accordance with one or more implementations of various techniques described herein.

Otherwise, if the e-mail 310 does contain images 210 added inside the HTML body of the e-mail 310, it may be used as an input into an add link module 330. The add link module 330 may alter the HTML body of the e-mail 310 such that a new option may be created for the recipient to download all of the high resolution image files from its respective URL location at one time. This option may be created in the form of an HTML link that may indicate to the HTML rendering engine 61 when to provide the HTML event handler 62 a notification to start the image file download process as illustrated in FIGS. 5. In one implementation, the HTML link may display "Save All Images," but it should be noted that a variety of similar phrases may also be used instead.

The add link module 330 may then produce the altered e-mail 310, or linked e-mail 340, as its output. The linked e-mail 340 may then be used as an input to the display e-mail module 350. The display e-mail module 350 may then use the HTML rendering engine 61 to display the linked e-mail 340.

Figure 4:
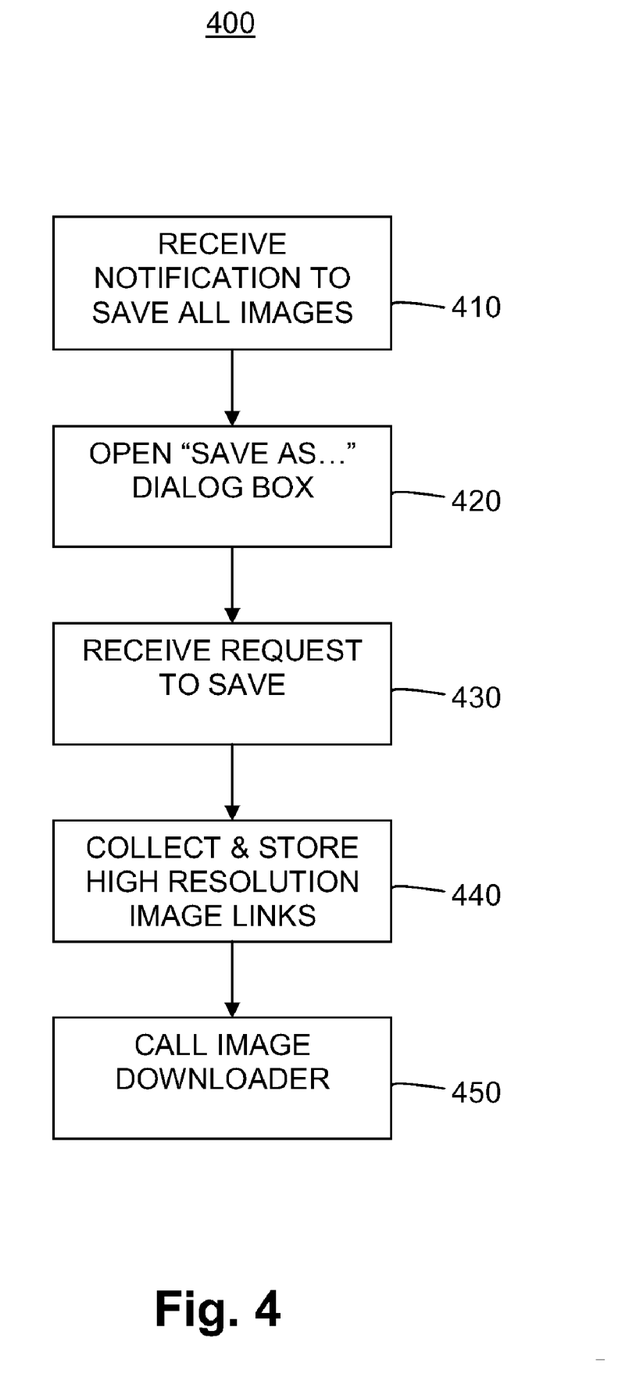
FIG. 4 illustrates a flow diagram of a method for calling an image downloader in accordance with one or more implementations of various techniques described herein.

FIG. 4 illustrates a flow diagram of a method 400 for the HTML event handler 62 to initiate the automatic download of every high resolution image file corresponding to the images 210 within the HTML body of the linked e-mail 330 in accordance with one or more implementations various techniques described herein. The following description of the method 400 is made with reference to the computing system 100 of FIG. 1, the data flow diagram of FIG. 2, the data flow diagram of FIG. 3, and the flow diagram of FIG. 5 in accordance with one or more implementations of various techniques described herein.

At step 410, the HTML handler 62 may receive a notification from the HTML rendering engine that the user has selected the "Save All Images" link, created in the add link module 330 of FIG. 3. In one implementation, the "Save All Images" link may be selected by the user with the pointing device 42, while using the e-mail client desktop application 60.

At step 420, the HTML event handler 62 may open a "Save As" dialog box on the e-mail client desktop application 60 so that the user may specify the memory location as to where the high resolution image files are to be stored.

At step 430, the HTML event handler 62 may receive a request to save the high resolution image files to the specified memory location. The specified memory location may be a memory location on the user's local machine, a USB external drive, or any other similar memory device. In one implementation, the user may select the "Save" button inside the dialog box after he has specified the memory location in which the files may be stored.

At step 440, the HTML event handler 62 may search the HTML body of the linked e-mail 330 for the extension or tag concatenated to the URL address of each high resolution image file. Upon locating a tag, the HTML event handler 62 may store the corresponding URL address to a temporary memory allocated within the e-mail client desktop application 60. The HTML event handler 62 may continue to locate tags and store URL addresses with concatenated tags into this memory location until all of the URL addresses have been stored.

At step 450, the HTML event handler 62 may call the image downloader thread 63 to start downloading each high resolution image file from its respective URL address.

FIG. 5 illustrates a flow diagram of a method 500 for the image downloader thread 63 to download every high resolution image file corresponding to the images 210 added to the HTML body of the linked e-mail 330 in accordance with one or more implementations various techniques described herein. The following description of the method 500 is made with reference to the computing system 100 of FIG. 1, the data flow diagram of FIG. 2, the data flow diagram of FIG. 3, and the flow diagram of FIG. 4 in accordance with one or more implementations of various techniques described herein.

At step 510, the image downloader thread 63 may extract one URL address from the list of URL addresses of high resolution image files stored in the temporary memory allocated within the e-mail client desktop application 60. In one implementation, the image downloader thread 63 may initially download the first URL address listed in the memory.

At step 520, the image downloader thread 63 may send a command to a URLMON component to download the high resolution image file that is located at the URL address extracted at step 510. URLMON is a Dynamic Link Library (DLL) component, which is part of the web browsing capabilities of the operating system. URLMON may be loaded within the context of any process running in the operating system using URL based operations, such as remote resource download.

At step 530, upon receiving the command to download the high resolution image file, the URLMON component may connect to the URL address and download the high resolution image file to the cache of user's local machine. The URL-MON component may be part of the HTML rendering engine 61 and may also be used to download other files such as documents, zip files, and the like.

In one implementation, the image downloader thread 63 may generate an alternative file name if the user specified memory location contains a file that has the same name as the downloaded file (step 540). For example, the URLMON component may download and store an image file named "picture." If the user's specified memory location already contains a file named "picture," the image downloader thread 63 may generate a new name for the downloaded file such as "picture_01" in order to prevent files from being overwritten. If the user's specified memory location does not contain a file with the same file name, the image downloader thread 63 may not generate an alternative file name. Instead, the image downloader thread 63 may move to step 550.

At step 550, the image downloader thread 63 may copy the image file stored on the local machine's cache to the specified memory location as defined in step 420 on FIG. 4.

The image downloader thread 63 may repeat steps 510-550 for each URL address listed in the temporary memory allocated within the e-mail client desktop application 60 until every high resolution image file is copied to the user's specified memory location.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for receiving an e-mail, comprising:
    receiving the e-mail at an e-mail client desktop application;
    determining whether two or more image files have been added to the e-mail;
    displaying the e-mail with an HTML link configured to concurrently download the two or more image files;
    receiving a selection to concurrently download the two or more image files; and
    scanning the e-mail for two or more tags concatenated to two or more URL addresses in the e-mail that correspond to the two or more image files.

2. The method of claim 1, comprising:
    downloading the two or more image files stored at the URL addresses.

3. The method of claim 2, downloading comprising at least one of:
    storing the two or more URL addresses in memory;
    extracting the two or more URL addresses from memory; and
    sending a command to a URLMON component to download the two or more image files.

4. The method of claim 3, the two or more URL addresses stored in a temporary memory of the e-mail client desktop application.

5. The method of claim 1, comprising:
    receiving a memory location in which to store the two or more image files; and
    downloading the two or more image files to the memory location.

6. The method of claim 1, comprising:
    storing the two or more URL addresses in memory; and
    calling an image downloader thread to start downloading the two or more image files.

7. The method of claim 6, comprising:
extracting the two or more URL addresses from memory; and
sending a command to a URLMON component to download the two or more image files.

8. The method of claim 6, the two or more URL addresses stored in a temporary memory of the e-mail client desktop application.

9. A computer system, comprising:
a processor; and
a memory comprising program instructions executable by the processor to:
    receive an e-mail at an e-mail client desktop application;
    determine whether two or more image files have been added to the e-mail;
    display the e-mail with an HTML link configured to concurrently download the two or more image files;
    receive a selection to concurrently download the two or more image files; and
    scan the e-mail for two or more tags concatenated to two or more URL addresses in the e-mail that correspond to the two or more image files.

10. The computer system of claim 9, the memory comprising program instructions executable by the processor to:
    receive a memory location in which to store the two or more image files; and
    download the two or more image files to the memory location.

11. The computer system of claim 9, the memory comprising program instructions executable by the processor to download the two or more image files stored at the URL addresses.

12. The computer system of claim 9, the memory comprising program instructions executable by the processor to store the two or more URL addresses in a temporary memory.

13. The computer system of claim 12, the two or more URL addresses stored in the temporary memory of the e-mail client desktop application.

14. The computer system of claim 12, the memory comprising program instructions executable by the processor to:
    extract the two or more URL addresses from the temporary memory; and
    send a command to a URLMON component to download the two or more image files.

15. A computer readable device having computer-executable instructions, which when executed perform actions, comprising:
    receiving an e-mail at an e-mail client desktop application;
    determining whether two or more image files have been added to the e-mail;
    displaying the e-mail with an HTML link configured to concurrently download the two or more image files;
    receiving a selection to concurrently download the two or more image files; and
    scanning the e-mail for two or more tags concatenated to two or more URL addresses in the e-mail that correspond to the two or more image files.

16. The computer readable device of claim 15, the actions comprising:
    downloading the two or more image files stored at the URL addresses.

17. The computer readable device of claim 15, the actions comprising:
    extracting the two or more URL addresses from memory; and
    sending a command to a URLMON component to download the two or more image files.

18. The computer readable device of claim 15, the two or more URL addresses stored in a temporary memory of the e-mail client desktop application.

19. The computer readable device of claim 15, the actions comprising:
    calling an image downloader thread to start downloading the two or more image files.

20. The computer readable device of claim 15, the actions comprising:
    receiving a memory location in which to store the two or more image files; and
    downloading the two or more image files to the memory location adding an HTML link to the e-mail to facilitate concurrently downloading the two or more image files.

\* \* \* \* \*